Jan. 18, 1966     R. J. KELLER III     3,229,710
PLASTIC MIXING VALVES

Filed Jan. 30, 1964     2 Sheets-Sheet 1

INVENTOR
Robert J. Keller, III

BY Mason, Fenwick & Lawrence
ATTORNEYS

Jan. 18, 1966     R. J. KELLER III     3,229,710
PLASTIC MIXING VALVES
Filed Jan. 30, 1964                              2 Sheets-Sheet 2
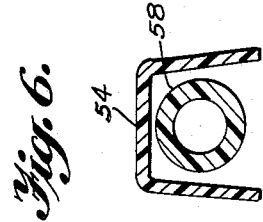
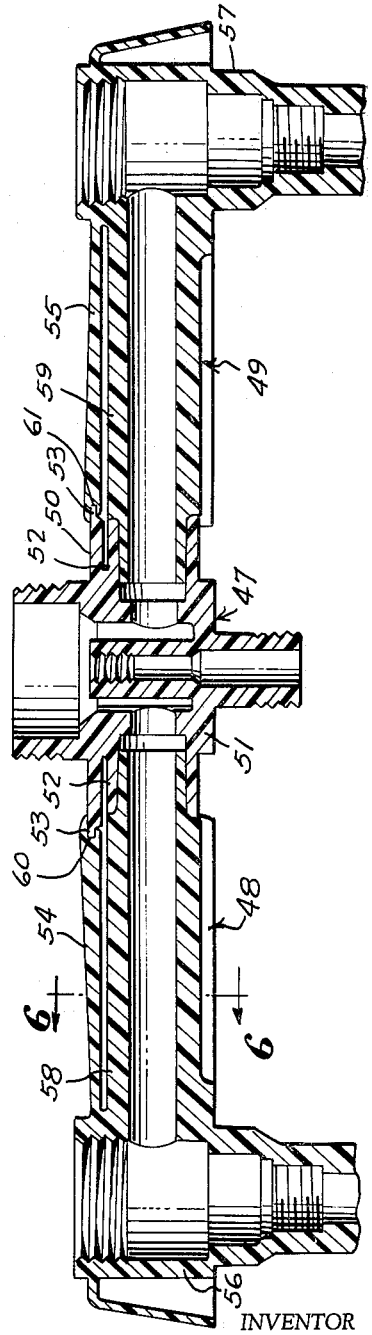
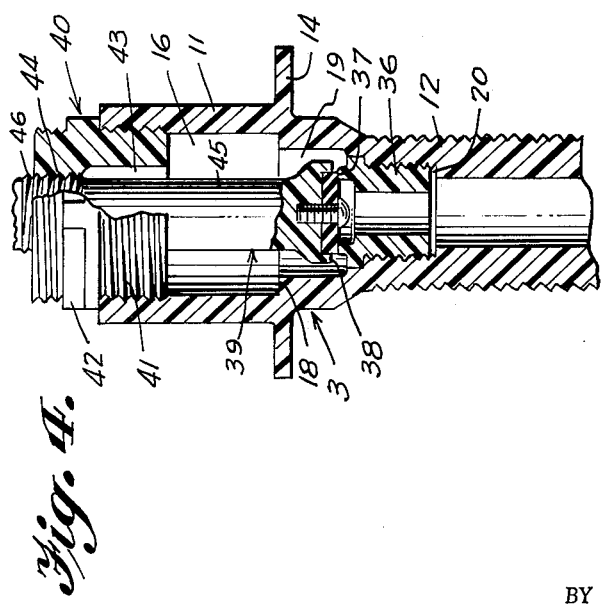
INVENTOR
Robert J. Keller, III
BY Mason, Fenwick & Lawrence
ATTORNEYS United States Patent Office 3,229,710
Patented Jan. 18, 1966

3,229,710
PLASTIC MIXING VALVES
Robert J. Keller III, Rte. 3, Chester, Va.
Filed Jan. 30, 1964, Ser. No. 341,188
3 Claims. (Cl. 137—315)

This invention relates to valves and valve fixtures, and particularly to such equipment peculiarly adapted for construction with plastic materials, and is a continuation-in-part of co-pending application Serial No. 182,037, filed March 23, 1962, entitled Plastic Valves, and now abandoned.

The general object of the present invention is to provide improved plastic valves, valve fixtures and assemblies, which are extremely simple to install, which can be installed with little probability of breakage, which will be efficient in operation and which will have long life in use.

A more specific object is to provide a plastic valve having a casing with more than one valve seat, whereby valving members of different types may be used selectively with one standard casing.

Another object of the invention is the provision of a valve having a unitary mounting nut permitting a simultaneous double seal seating, thereby eliminating the danger of breaking the parts due to the separate tightening of the two elements.

A further object is to provide a valve assembly wherein a mixing chamber is positioned between two valves, and the chamber and valves and connecting piping are formed as three units, which are interconnectible by two joints to form the complete assembly.

Yet another object of the invention is to provide an assembly as described, wherein each of the units has an integral cover portion, with the cover portions of the several units being connectible to form a cover for the entire assembly.

Other objects of the invention will become apparent from the following description of practical embodiments thereof, when taken in conjunction with the drawings which accompany, and form part of, this specification.

In the drawings:

FIGURE 4 is a view similar to FIGURE 3, but with a different type valve in the casing;

FIGURE 5 is a longitudinal section through an assembly of modified construction; and FIGURE 6 is a transverse section taken on the line 6—6 of FIGURE 5.

In general, the invention is concerned with a valve assembly wherein at least all of the plumbing parts are formed of plastic, and the assembly is composed of a minimum number of integral units joined to one another. The valve casings have novel valve seating arrangements, and improved means are employed to secure the valve in place in the casing to obtain maximum sealing with little probability of breaking the casing or other members under tightening pressure.

Figure 1:
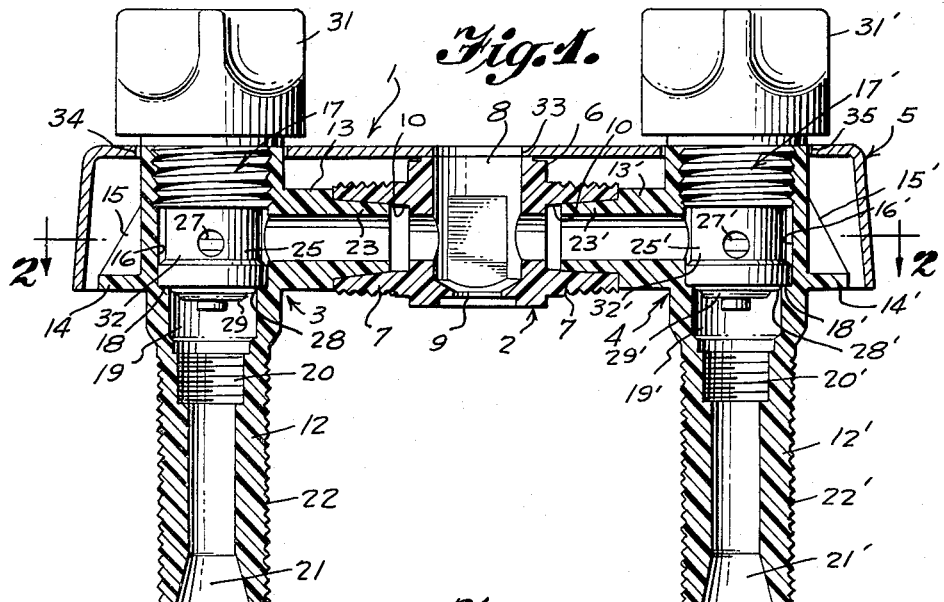
FIGURE 1 is a longitudinal sectional view through a valve and mixing chamber assembly constructed in accordance with the principles of the present invention.
Figure 2:
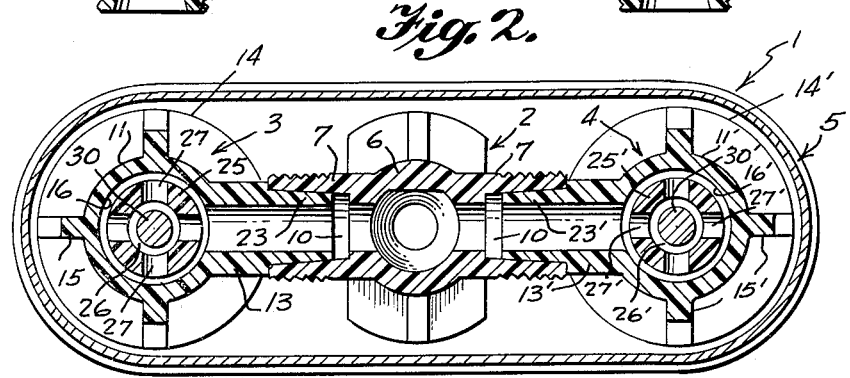
FIGURE 2 is a horizontal section through the assembly, taken on the line 2—2 of FIGURE 1.
Figure 3:
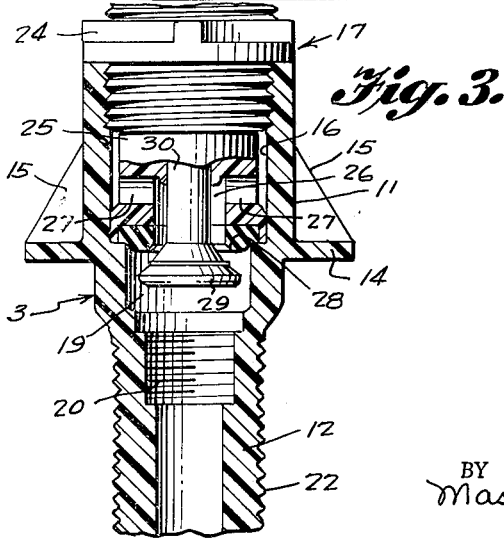
FIGURE 3 is an enlarged vertical section through part of one of the valves with a portion of the valving member broken away to show interior construction.

Referring to the drawings in detail, and first to that form of the invention shown in FIGURES 1 to 3, a valve assembly 1 is disclosed having a mixing chamber unit 2, valve units 3 and 4 and a cover 5.

All of these units, with the exception of the cover, are formed of a suitable plastic material. Many different synthetic compounds may be used, such as those known as Delrin, Celcon, and Lexan, and the parts are so designed that they may be injection molded quite readily.

The mixing chamber unit 2 is an integrally molded member of T-form, with a central body 6 and lateral pipe ends 7. The central body is open from end to end, and constructed to receive an outlet spout (not shown) at the top 8, and a suitable closure (not shown) at the bottom 9. The pipe ends terminate in inwardly converging sockets 10.

The valve units 3 and 4 are identical. Therefore, only valve 3 will be described in detail, with the same parts being identified on the valve 4 by the same reference characters primed. The valve unit is composed of a valve body, or casing, 11 having a depending pipe section 12 in axial alignment with the body, and a horizontal pipe section 13, extending laterally from the body for connection to the mixing chamber unit. The valve body, depending pipe section 12 and lateral pipe sections 13 are molded as an integral unit.

The valve body is a cylindrical member having a substantially circular base mounting flange 14. Suitable bracing webs 15 between the flange and the body wall stiffen the flange. The body contains a central chamber 16 with which the lateral and depending pipes communicate. The chamber walls are threaded at the top to mount the valve 17. Below the lateral pipe connection with the chamber, there is an annular shoulder 18 which forms one of the valve seats of the unit. Beneath the seat, there is a secondary chamber 19, of smaller diameter than chamber 16, and beneath that is a threaded passage 20, into which an adapter to be later described can be screwed to supply a second seat and convert the valve body to use with a different type valving member. The valve body and depending pipe section merge in the area of passage 20, and the pipe has an inside diameter which is uniform to a point near the bottom where it flares to form a socket 21. The outer surface of pipe section 12 is threaded, as at 22, for coupling to a water line. The lateral pipe 13 terminates in a tapering nipple 23 for seating in the socket 10 of the mixing chamber unit.

The valve 17 is mounted in the top of the valve body and is screwed into place by means of the nut 24 formed on the valve. The valve is of the general type shown in United States Letters Patent No. 2,658,716, issued November 10, 1953, to Robert N. Winfree, and reference may be had to that patent for a full disclosure of the valve member. Insofar as the present application is concerned, it is only necessary to state the valve includes a barrel 25, having a central chamber 26 into which radial ports 27 open. The chamber is open at the bottom and the barrel is provided with a valve seat 28 with which a valve head 29 cooperates to open and close the bottom opening to chamber 26. Valve head 29 is carried by a stem 30 which is raised and lowered by operation of valve handle 31, as described in the above mentioned prior patent.

There is one important difference, however, between the valve of the present invention and that of the prior patent. In the prior patent, the valve casing, or body had an annular recess in about the area of the barrel ports to provide an open area into which the ports could empty, so that water could flow from the bottom of the valve body, through the chamber in the barrel, out through the barrel ports and into the lateral outlet from the valve body. Due to molding difficulties, a valve body of plastic is not feasible with an internal, undercut annular recess. In order to provide the same action, the barrel 25 of the present valve is provided with an external annular recess 32 into which ports 27 open. With this construction, an annular compartment is formed about the barrel when the valve member is in place in the chamber 16 of the valve body, and this compartment is in communication with the lateral outlet of the valve body as before.

It is to be noted particularly, that the nut 24 is formed integrally with the barrel 25, and that the distance from the bottom face of the nut to the bottom of the barrel is equal to the depth of chamber 16 in the valve body. Because of this, the base of the barrel will seat, and seal, against the annular shoulder 18 in the valve body as the nut 24 seats, and seals, against the top of the valve body. This not only provides a double seal, but at the same time, assures sealing of the barrel on shoulder 18 without undue strain on the valve parts, and reduces greatly the possibility of breaking the plastic parts of the valve assembly.

The two valve units 3 and 4 and the mixing chamber unit 2 are united by inserting the nipples 23 and 23' at the ends of the lateral pipe sections of the valve units into the sockets 10 of the mixing chamber unit pipe ends 7. Suitable means will be used to adhere the units together in assembled relation, such as heat sealing with Delrin and Selcon, and heat sealing or gluing in the case of Lexan. The cover 5 of metal or plastic, having openings 33, 34 and 35 to receive the upper ends of the respective valve bodies and mixing chamber body, is slipped over the ends of these members to provide a suitable finished appearance for the assembly. Mounting of the spout will prevent removal of the cover.

Turning now to the structure shown in FIGURE 4 of the drawings, a portion of the valve body 11 of valve unit 3 is shown, with an adapter 36 in place in the threaded passage 20 to provide a seat 37 for the head 38 of a simplified valve member 39. Valve member 39 includes a mounting thimble 40, which has an externally threaded portion 41 to screw into the threaded upper end of valve body 11, and a nut portion 42 by means of which the thimble may be tightened in operative position and sealed at the top of the body. The thimble has an axial central bore 43 which is threaded along at least a portion of its length, as at 44. A stem 45 carries the valve head 38, and has a threaded area 46 for engagement with the threads 44 in the bore 44, so that rotation of stem 45 will raise and lower the valve head relative to the seat 37.

It will be obvious that the valve member shown in FIGURE 4 is much simpler than the one shown in FIGURES 1 to 3, and that the use of the adapter to provide a second valve seat permits the one casing to be suitable for different installations. The valve bodies can be furnished with the adapter in place, and either type valve member may be used with it. If the valve member as shown in FIGURES 1 to 3 is to be used, the adapter can be removed or left in place. If left in place it will not interfere with the free operation of the valve and will be available if the structure of FIGURE 4 should be desired later. It is of course possible to mold the second seat as an integral part of the valve body.

In FIGURES 5 and 6, a slightly modified assembly has been shown. Here, the mixing chamber unit 47 and the valve units 48 and 49 are substantially the same as previously described, but each of these units has a portion of a cover element formed integrally with it. The mixing chamber unit has a cover segment 50 which is integral with the body member 51, and projects from the body member in overlying relation to the projecting pipe ends 52. The cover segment is of inverted U-shape in transverse section, and terminates at its free ends in tongues 53. The cover segment is approximately coextensive with the pipe ends 52. Valve units 48 and 49 carry the cover end-segments 54 and 55. These, also, are of inverted U-shape in section, and are integral with the valve casings, or bodies, 56 and 57. The cover end segments project in spaced relation to the horizontal pipe sections 58 and 59 of the valve units and are about the same length as these sections. The cover end segments 54 and 55 have grooves 60 and 61 in their free edges to receive the tongues 53 of the control cover segment.

In assembling this form of the invention, the ends of the pipe sections of the several units are joined as before, and an adhesive joint may be made between the tongues and grooves of the respective cover segments. This assembly may be made more quickly than the form shown in FIGURES 1 to 3, as one operation joins the plumbing units and cover. This construction permits an all plastic valve assembly.

All of the forms shown lend themselves to inexpensive production, yet will provide long and satisfactory operation. The various units can be assembled very quickly, much more rapidly than is possible with parts of conventional construction. The plastic parts are self lubricating so that movable parts remain free and easy to operate throughout their full life.

While in the above, practical embodiments of the invention have been disclosed, it will be understood that the detailed construction shown and described are merely by way of example, and the invention may take other forms within the scope of the appended claims.

What is claimed is:

1. A valve assembly comprising, a mixing chamber unit of plastic material having a central body with a mixing chamber therein and lateral pipe ends integral with the central body and in communication with the mixing chamber, the pipe ends having free ends remote from the central body with sockets therein, a valve unit of plastic material at each side of the mixing chamber unit, each valve unit including a body having a valve seat therein and a valve member seatable on the seat, the valve body having a central chamber with an inlet pipe integral with the valve body and opening to the central chamber in the valve body and an outlet pipe integral with the valve body and opening to the valve body chamber, the valve member controlling fluid flow from the inlet pipe to the outlet pipe through the valve body chamber, the outlet pipes having free ends remote from the valve body terminating in nipples seated in and adhesively connected to the sockets in the pipe ends of the mixing chamber unit, and the valve body of each valve unit having a second seat of smaller diameter than the first-mentioned seat spaced from the first-mentioned seat outwardly from said chamber, whereby a single valve body may be used with selected valve members.

2. A valve assembly as claimed in claim 1 wherein, the second seat is formed on a threaded adapter, and the valve body has a threaded passage into which the adapter may be removably screwed.

3. A valve assembly comprising, a mixing chamber unit of plastic material having a central body with a mixing chamber therein and lateral pipe ends integral with the central body and in communication with the mixing chamber, the pipe ends having free ends remote from the central body, a cover section integral with the central body and extending laterally in overlying spaced relation to the pipe ends, a valve unit of plastic material at each side of the mixing chamber unit, each valve unit including a body having a valve seat therein and a valve member seatable on the seat, the valve body having a central chamber with an inlet pipe integral with the valve body and opening to the central chamber in the valve body and an outlet pipe integral with the valve body and opening to the valve body chamber, the valve controlling fluid flow from the inlet pipe to the outlet pipe through the valve body chamber, a cover section integral with the valve body and extending laterally in overlying and spaced relation to the outlet pipe, the outlet pipes and the pipe ends of the mixing chamber unit having interfitting ends adhesively connected, and the cover sections of the valve units and mixing chamber unit having interfitting ends adhesively connected.

References Cited by the Examiner

UNITED STATES PATENTS

| | | | |
|---|---|---|---|
| 1,945,724 | 2/1934 | Beebe | 137—269 |
| 2,520,092 | 8/1950 | Fredrickson | 137—454.5 |
| 2,659,389 | 11/1953 | Harvey | 137—606 XR |
| 2,956,579 | 10/1960 | Moore | 137—218 |
| 3,082,786 | 3/1963 | McLean | 137—454.5 |
| 3,117,587 | 1/1964 | Willinger | 251—367 XR |

ISADOR WEIL, *Primary Examiner.*